W. H. SCHOONMAKER.
STARTING VALVE FOR GAS ENGINES.
APPLICATION FILED JULY 8, 1912.
1,121,140.
Patented Dec. 15, 1914.
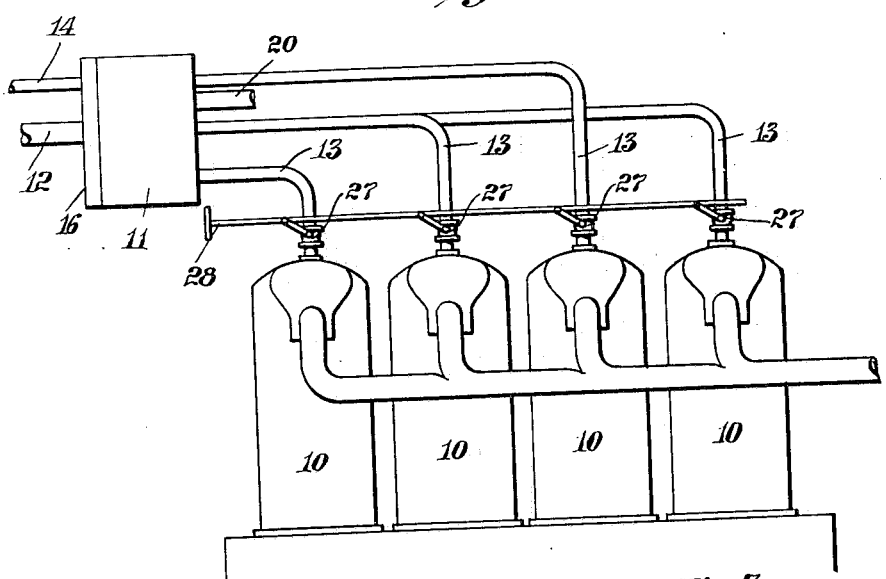
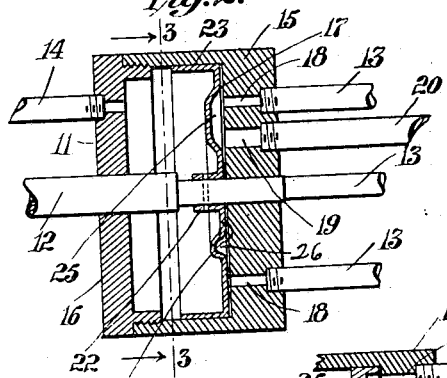
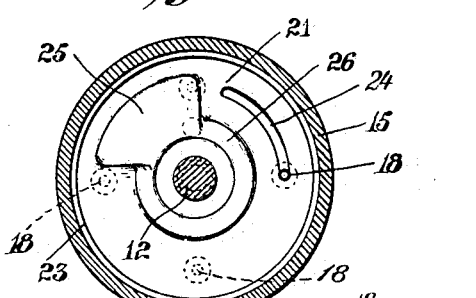
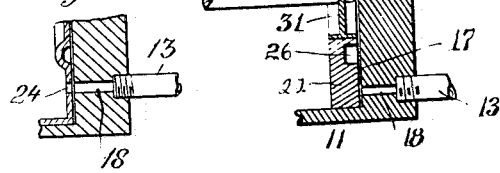
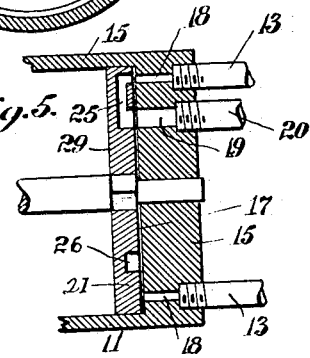
Inventor:
William H. Schoonmaker
by
Attys

UNITED STATES PATENT OFFICE.

WILLIAM H. SCHOONMAKER, OF MONTCLAIR, NEW JERSEY.

STARTING-VALVE FOR GAS-ENGINES.

1,121,140.

Specification of Letters Patent. Patented Dec. 15, 1914.

Application filed July 8, 1912. Serial No. 708,113.

*To all whom it may concern:*

Be it known that I, WILLIAM H. SCHOONMAKER, a citizen of the United States of America, and a resident of Montclair, in the county of Essex and State of New Jersey, have invented certain new and useful Improvements in Starting-Valves for Gas-Engines, of which the following is a specification.

My invention relates to starting valves for internal combustion engines, particularly multi-cylinder internal combustion engines, and it comprises an improved valve structure wherein provision is made for supplying compressed air or other suitable compressed gas to the cylinders of the engine, at proper times and in proper succession, together with provision for relieving pressure in the cylinder or cylinders which are in the compression stage of the cycle.

The object of my invention is to provide an improved and simplified starting valve of the type referred to, which valve shall be capable of starting the engine with a minimum supply of compressed air or other gas, and which shall operate with a minimum of friction and shall be simple, compact and inexpensive.

I will now proceed to describe my invention with reference to the accompanying drawings, and will then point out the novel features in claims.

In the drawings: Figure 1 shows more or less diagrammatically an elevation of an engine with my improved starting valve connected thereto. Fig. 2 shows an axial section of one form of said valve, and Fig. 3 shows a transverse section of the valve shown in Fig. 2, said section being taken on the line 3—3 of Fig. 2. Fig. 4 shows an axial section of an alternative form of valve, and Fig. 5 shows an axial section of still a further alternative form of valve. Fig. 6 is a fragmentary sectional view of the construction shown in Fig. 2, showing the admission port 24.

Referring first to Figs. 1, 2, 3 and 6 numerals 10 designate the cylinders of an internal combustion engine, numeral 11 designates a valve such as referred to, 12 designates a driving shaft for said valve, and 13—13 designate pipes or conduits leading from the valve to the several cylinders of the engine, while 14 designates a pipe or conduit for supplying air or other gas under pressure to the valve.

As shown particularly in Fig. 2, the valve comprises a casing consisting of a main hollow member 15 and a cover 16, the member 15 having a plane surface or valve seat 17 in which are ports 18 to which the several pipes or conduits 13 are connected; there being also in this valve seat a further pressure relief port 19 to which may be connected a pipe 20 leading to some suitable spot at which the explosive mixture within the engine cylinders may be discharged safely.

Within the member 15 is located a rotary distributing valve 21, mounted upon shaft 12 to rotate therewith. In the construction shown, this valve 21 has the general form of a cup struck up from sheet metal, and consists in general of a disk provided with a hub 22 by which it may be secured conveniently to shaft 12, and also provided with a rearwardly extending peripheral flange 23, the principal function of which is to form a reasonably tight joint with the wall of the valve chamber in member 15. As shown particularly in Fig. 3, this valve disk 21 has a port 24 extending through it and so located that it will register successively with the several ports 18 as the shaft 12 revolves. This port 24 may subtend any suitable angle; in the drawings I have shown the valve as adapted for a four-cylinder four-cycle engine, in which case the shaft 12 and valve disk 21 will of course, be driven at half the crank-shaft speed, and will therefore be driven, conveniently, from the valve shaft, or timer shaft, or other suitable member, rotating at half crank shaft speed. I have further shown the valve port 24 as of such length that the cylinder to which the valve 11 is supplying air or gas under pressure at any instant, will receive such air or gas under pressure for full stroke, or nearly so; though obviously the angular length of this port 24 may be varied, and thereby the supply to each cylinder may be cut off before the end of the stroke.

The valve disk is further provided with a pressure relief port consisting of a recess 25 formed in the working face of the valve disk 21, which recess is adapted to register successively with the several ports 18 as the valve disk rotates, and is adapted to connect the several cylinders of the engine, successively, to the relief port 19 and discharge pipe 20. As shown particularly in Fig. 3, this relief port 25 of the valve comprises in part a circular groove 26 extending completely around the valve so that the relief port 25 communicates with relief port 19 of the valve seat at all times. The angle subtended by the portion of relief port 25 which is adapted to register with the several ports 18, may obviously be such angle as is desirable. In Fig. 3 I have shown said port 25 as subtending such angle as will cause said valve to relieve compression in the engine cylinder with which said port 25 may be in communication at any instant, throughout the compression period in that cylinder; but this angle may obviously be less, if desired.

In the pipes 13 leading from the valve 11 to the engine cylinders, are suitable valves 27 operated by a common valve operating member 28, whereby said conduits 13 are closed except when the starting device 11 is to be used. Such valves 27 prevent loss of compression, during normal running of the engine, by leakage backward into the valve 11 and so out through discharge pipe 20.

The exact order of connection of the different valve ports 18 to the different cylinders of the engine will depend upon the firing order of the particular engine to which the valve 11 is connected. As is well known, the firing order differs somewhat in different makes of engines. The connection of the various ports 18 to the various cylinders of the engine should always be such that, when the valve port 24 is in registry with a port 18 leading to a cylinder of the engine the piston and valves of which are in position for starting, under compressed air or other gas, (i. e., firing position), the relief port 25 will be in registry with that port 18 which is in communication with the cylinder of the engine the piston and valves of which are in position for compression, and therefore the relief port 25 will be in position to prevent compression in such cylinder.

In some cases it is deemed desirable that normally the valve disk 21 shall be in actual contact with the valve seat only when the starting valve is actually in use. In such case the valve disk may be so positioned upon the shaft 12 as to be normally clear of the valve seat. It is so indicated in Fig. 2. In such case, the flexibility of the valve disk is such that as soon as pressure is applied to its rear side, through supply pipe 14, the valve will be pressed against its seat. The clearance thus provided normally may be very slight; a thousandth of an inch clearance will in many cases be sufficient. Since the ordinary end play provided for a shaft is as great as this, and since a disk which is not pressed positively against a stationary seat, tends, when in rotation, to press very lightly, if at all, upon that seat, if the shaft driving such disk have slight end play, in general excessive wear will not result if the valve disk be a rigid disk, as indicated for example in Fig. 5, wherein 29 designates the valve disk; the recess and circular groove of the valve disk being designated by the same numerals as in the previous views.

An alternative construction is illustrated in Fig. 4, wherein the valve comprises a ring 30 having in it recess 25 and circular groove 26, said ring being carried by a flexible disk 31 secured to shaft 12. It will be understood, of course, that the valve shown in Fig. 4 has, like the valve shown in Fig. 2, an admission port 24; which port, however, is not shown in Fig. 4, as it is not in the plane of section of that figure. The flexibility of the disk 31 permits the ring 30 to move against the valve seat when pressure is applied behind the valve, the resilience of said disk 31 drawing the disk 30 away from the valve seat when pressure behind the valve is relieved.

What I claim is:—

1. A distributing valve for internal-combustion-engine starting-devices, comprising a closed cylindrical valve chamber having at one end a valve seat and ports in said seat for a plurality of engine cylinders, and for pressure relief, and a rotary valve in said chamber mounted to rotate continuously in one direction over said seat, and having an admission port adapted to register successively with the several cylinder ports of said valve seat during the rotation of the valve, and to connect said cylinder ports with the portion of the valve chamber behind said valve, said valve having also a port adapted to register successively with the several cylinder ports during the rotation of the valve, and also registering in all of its positions with the said relief port, and means for supplying fluid under pressure to the space in rear of said valve.

2. A distributing valve for internal-combustion-engine starting-devices, comprising a closed cylindrical valve chamber having at one end a flat valve seat, a plurality of cylinder ports in said seat, and a pressure relief port in said seat, and a rotary disk valve in said chamber mounted to coact with said seat and to rotate continuously in one direction, and having an admission port extending through the valve and adapted to register with the cylinder ports successively, and having also a pressure relief port adapted to register successively with the several cylinder ports and also registering in all of its positions with the pressure relief port in the seat, and means for supplying fluid under pressure to the space in rear of the said valve.

3. A distributing valve for internal-combustion-engine starting-devices, comprising a closed cylindrical valve chamber having at one end a valve seat and ports in said seat for a plurality of engine cylinders, and a rotary valve disk in said chamber mounted to rotate over said seat, but normally clear therefrom, and also fitting closely the wall of said chamber, said valve being itself resilient whereby pressure behind the valve forces it against said seat, said valve having an admission port adapted to register with the several cylinder ports of said seat successively, and to connect said cylinder ports with the portion of the valve chamber behind said valve, and means for supplying fluid under pressure to the space in rear of said valve.

4. A distributing valve for internal-combustion-engine starting-devices, comprising a closed cylindrical valve chamber having at one end a valve seat and ports in said seat for a plurality of engine cylinders, and for pressure relief, and a rotary valve disk in said chamber mounted to rotate over said seat, but normally clear therefrom, and also fitting closely the wall of said chamber, said valve disk being itself resilient whereby pressure behind the valve forces it against said seat, said valve having an admission port adapted to register with the several cylinder ports of said seat successively, and to connect said cylinder ports with the portion of the valve chamber behind said valve, said valve having also a port adapted to register successively with the several cylinder ports during the rotation of the valve, and also registering with the pressure relief port, and means for supplying fluid under pressure to the space in rear of said valve.

5. A distributing valve comprising a closed cylindrical valve chamber having at one end a valve seat and ports in said seat, and a rotary valve disk in said chamber mounted to rotate over said seat, and having a port adapted to register with the several seat-ports successively, said valve normally clear of said seat and being itself resilient, whereby pressure behind the valve forces it against said seat, and means for supplying fluid under pressure to the space in rear of said valve.

6. A distributing valve comprising a closed cylindrical valve chamber having at one end a valve seat and a plurality of ports in said seat, and a rotary resilient sheet metal valve in said chamber mounted to rotate over said seat, but normally clear therefrom, and having a flanged peripheral portion forming a joint with the wall of said valve chamber, and having also a port adapted to register successively with the several seat-ports during the rotation of the valve, and means for supplying fluid under pressure to the space in rear of said valve.

7. A distributing valve comprising a closed cylindrical valve-chamber, having at one end a valve seat and a series of ports in said seat equi-distant from the center of rotation, together with a further port located at a different distance from said center, and a rotary resilient sheet-metal valve within said chamber and adapted to rotate over said seat but normally clear therefrom, said valve having extending through it a port adapted to register successively with the said equi-distant ports during the rotation of the valve, and having also a pressed-in recess one portion of which is adapted to register successively with the several equi-distant ports, and the other portion of which is in constant registry with said other port, and means for supplying fluid under pressure to the space in rear of said valve.

8. A rotary valve, comprising a disk of thin resilient metal having a flanged edge, the side of such flange being substantially parallel with the axis of the disk, said disk having a valve port through it.

9. A rotary valve, comprising a disk of thin resilient metal having a flanged edge and having in one face a pressed-in recess constituting a valve port.

In testimony whereof I have signed this specification in the presence of two subscribing witnesses.

WILLIAM H. SCHOONMAKER.

Witnesses:
H. M. MARBLE,
D. A. DAVIES.